United States Patent
Pistagna et al.

(10) Patent No.: US 7,160,373 B2
(45) Date of Patent: Jan. 9, 2007

(54) INK FOR THERMAL INK JET PRINTING WITH HIGH PERFORMANCE AT HIGH EJECTION FREQUENCIES

(75) Inventors: Alessandra Pistagna, Ivrea (IT); Luigina Gino, Turin (IT)

(73) Assignee: Telecom Italia S.p.A., Milan (IT)

(*) Notice: Subject to any disclaimer, the term of this patent is extended or adjusted under 35 U.S.C. 154(b) by 15 days.

(21) Appl. No.: 11/129,314

(22) Filed: May 16, 2005

(65) Prior Publication Data

US 2005/0204954 A1 Sep. 22, 2005

Related U.S. Application Data

(63) Continuation of application No. 10/451,110, filed as application No. PCT/IT01/00647 on Dec. 20, 2001, now Pat. No. 6,926,766.

(30) Foreign Application Priority Data

Dec. 20, 2000 (IT) .......................... TO2000A1193

(51) Int. Cl.
C09D 11/02 (2006.01)

(52) U.S. Cl. .................. 106/31.58; 106/31.59
(58) Field of Classification Search ............. 106/31.58, 106/31.59
See application file for complete search history.

(56) References Cited

U.S. PATENT DOCUMENTS

| | | | |
|---|---|---|---|
| 4,279,653 A | 7/1981 | Makishima et al. | |
| 5,431,720 A * | 7/1995 | Nagai et al. | 106/31.43 |
| 5,514,208 A * | 5/1996 | Nagai et al. | 106/31.43 |
| 5,580,372 A | 12/1996 | Gino et al. | |
| 5,883,157 A | 3/1999 | Yamashita et al. | |
| 5,935,308 A | 8/1999 | Siddiqui et al. | |
| 5,972,082 A | 10/1999 | Koyano et al. | |
| 6,051,629 A | 4/2000 | Ichikawa et al. | |
| 6,500,246 B1 | 12/2002 | Huang et al. | |
| 6,514,330 B1 | 2/2003 | Kanaya et al. | |
| 6,592,657 B1 | 7/2003 | Lee et al. | |
| 2004/0003755 A1 | 1/2004 | Fukumoto | |

FOREIGN PATENT DOCUMENTS

| | | |
|---|---|---|
| EP | 0 449 606 | 10/1991 |
| EP | 0 690 107 | 1/1996 |

* cited by examiner

*Primary Examiner*—Jerry Lorengo
*Assistant Examiner*—Veronica Faison-Gee
(74) *Attorney, Agent, or Firm*—Venable LLP; Robert Kinberg; Steven J. Schwartz (57) ABSTRACT

This invention relates to a water-based ink for ink-jet thermal printing containing a surface-active agent having, at a certain concentration, a slow dynamic rearrangement.

This surfactant system gives the ink a high surface tension under dynamic conditions which grants greater droplet ejection frequencies with respect to the inks usually employed. At the same time, the ink's low static surface tension value means that it has correct paper wettability properties.

40 Claims, 4 Drawing Sheets

INK FOR THERMAL INK JET PRINTING WITH HIGH PERFORMANCE AT HIGH EJECTION FREQUENCIES

CROSS-REFERENCE TO RELATED APPLICATIONS

This application is a continuation of U.S. application Ser. No. 10/451,110, filed Jun. 19, 2003, now allowed, which is a National Stage application of PCT application No. PCT/IT01/00647, filed Dec. 20, 2001, which was published in English under PCT Article 21(2) on Jun. 27, 2002, and which claims the benefit of priority of Italian application No. TO2000A001193, filed Dec. 20, 2000. U.S. application Ser. No. 10/451,110; PCT application No. PCT/IT01/00647; and Italian application TO2000A001193 are hereby incorporated by reference in their entireties.

TECHNICAL FIELD

This invention relates to an ink for ink jet thermal printing: in this technology, an image is formed on a physical medium (for instance, paper) through the deposition of droplets of ink emitted by the nozzles of a printhead; in particular, the invention refers to the surface-active component of the ink.

BACKGROUND ART

The ink jet printing technology is well known in the sector art and has been described in numerous patents and publications.

In short, ink jet printing is based on the ejection of droplets of ink from a head; the different nature of the droplet ejection modes distinguishes thermal ink jet printers from piezoelectric type ones.

Thermal ink jet printing technology is identified by the acronym TIJ—Thermal Ink Jet—and it is to this type that this invention relates.

Figure 1:
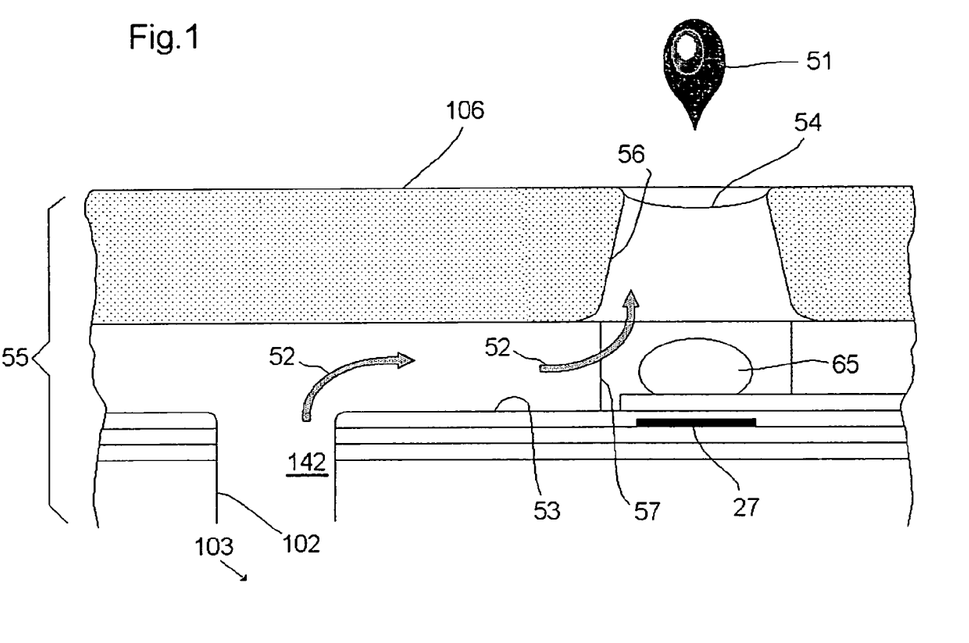
FIG. 1 is a section of an ejector assembly of a thermal ink jet head.

Depicted in FIG. 1 is a section of an ejector assembly 55 of a thermal type ink jet head in which the following are indicated:

- a tank 103 (generally a sponge), connected through a slot 102 to the ejector assembly 55, which contains ink 142;
- an inlet channel 53;
- a chamber 57 located in correspondence with a resistor 27;
- a nozzle 56;
- arrows 52, indicating the prevalent direction of motion of the ink 142 from the tank 103 to the nozzle 56;
- a nozzle plate 106, generally though not exclusively made of a lamina of gold-plated nickel or kapton;
- a vapour bubble 65;
- a meniscus 54 local to the surface of separation, generally referred to as interface by those skilled in the art, between the ink 142 and the air; and
- a droplet 51 of ink.

The energy required for ejecting the ink droplet 51 is supplied by the resistor 27, which heats rapidly through the effect of a current resultant on a signal coming from a microprocessor. The heating creates the vapour bubble 65 which causes the expulsion of the ink droplet 51 through the nozzle 56.

During the ejection process, in correspondence with each nozzle 56, the meniscus 54, by breaking and forming again, regulates the correct formation and expulsion of the ink droplet 51, as is known to those skilled in the art.

The printed images are formed by the ink dots that the ejected droplets form upon the physical medium, for example the paper. The quality of the images obtained with ink jet printing depends on a variety of factors, such as for instance the properties of the ink and of the substrate, which include the "spreading" and the penetration of the ink, the roughness of the paper, the water-fastness of the ink once printed, the mechanical design of the head, which includes the disposition of the ejection holes and the paper transport system, the droplet formation, which includes the ejection frequency, the speed and angle of impact of the droplet on the paper, and the printer specifications, which include, for example, resolution, presence or otherwise of "halftoning" and of "dot-on-dot" management, as is known to those skilled in the art.

The most commonly used inks in ink jet printing are:
water-based inks;
inks based on pigment dispersions; and
solvent based inks.

The latter often present toxicity problems which require a controlled recovery and disposal of the solvent. In the case of pigment-based inks, which give highly vivid colours, the size of the particles of the pigment is often a critical factor as it is accompanied by "clogging" (complete or partial obstruction of the nozzles) in micro-hydraulic systems as required by recent technology.

The majority of inks for ink jet printing use water as the solvent: this invention relates to inks of this type.

In TIJ printing technology, specially formulated inks are used having precise characteristics, among which those in the following non-restrictive list:

- ink properties: pH between 6 and 10, viscosity ranging from 1 to 5 mPa*s @ 25° C. and surface tension between 20 and 50 mN/m @ 25° C.;
- optical density characteristics conforming to the application of the printer: varyingly vivid colours or with tones depending on the print application and cultural factors, related for instance to the geographical area the product is sold in;
- storage stability both from the chemical and microbiological point of view;
- complete thermal stability so as not to form insoluble residues on the resistor during the thermal bubble formation process which would compromise subsequent ejections;
- ability to produce high quality images on a wide variety of papers and media in general;
- perfect operation of the printhead throughout its entire service life;
- compatibility with the other materials comprising the printhead; and
- safety of use for the user and absence of environmental damage.

The essential components of the ink are the solvent and the dye, but the following are also found in the various formulations, by way of non-restrictive example:

- biocides, which prevent the growth of biological material which could lead to blocking of the holes;
- humectants, which reduce the extent of evaporation of the ink during operation of the printer; and
- surface-active agents, whose functions are examined in the following.

As is known to those skilled in the art, a surface-active agent is a substance which, when added in a certain quantity to a liquid system, considerably reduces its surface tension.

The molecules of surface-active agents are amphoteric structures as they contain a hydrophilic part and a hydrophobic part and are characterized by a quantity known to those skilled in the art as HLB (Hydrophylic-Lipophylic Balance).

Figure 2:
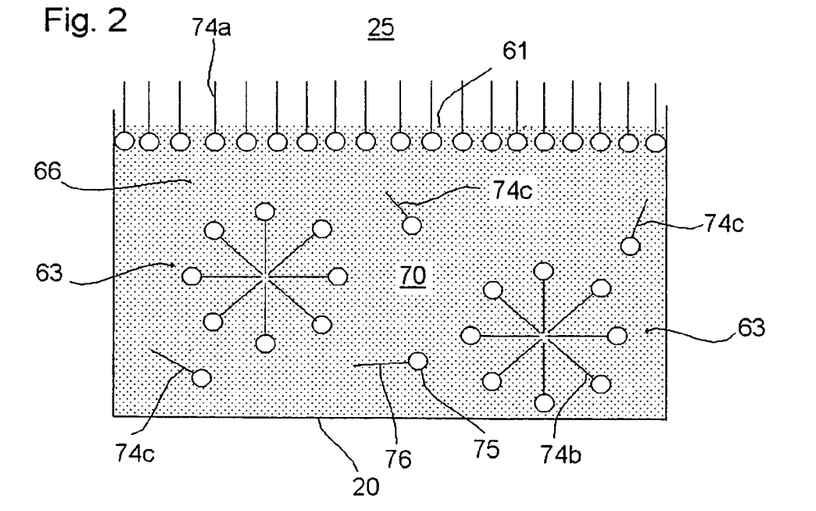
FIG. 2 is a water-based liquid system containing a surface-active agent in a concentration greater than the cmc.

FIG. 2 is a diagram of a water-based liquid system 70 comprising molecules 74a, 74b and 74c of a surface-active agent, each of which has a hydrophylic part 75 and a hydrophobic part 76. This liquid system 70 is contained in a vessel 20 and is in contact with the air 25 through an interface 61. The mass of the liquid, or "bulk" to those skilled in the art, is designated with the numeral 66.

By its amphotic nature, the surface-active agent is found in the system it is inserted in, such as for example the system 70, in the following ways:

molecules 74a are arranged on the interface 61 with the hydrophobic part 76 facing the outside; this arrangement effectively separates the molecules of the water-based medium which, if the surface-active agent were missing, would be one beside the other at the interface 61, thus diminishing cohesion and thereby lowering surface tension;

molecules 74b form micelles 63 in the bulk of the liquid. These are formed because the molecules of the surface-active agent are above a concentration called "critical micellar concentration"—cmc—leading some molecules which cannot find room at the interface to agglomerate in the bulk in the prevalently spherical shape micelles 63; and molecules 74c are scattered through the bulk 66.

A system containing a surface-active agent, such as any liquid system, is characterized by an equilibrium surface tension ($\tau_{stat}$), measured under static conditions using the method known as "DuNuoy ring" or the "Wilhelmy plate" method. Under static conditions, the surface-active agent has sufficient time to migrate to the interface 61 and cause the system to reach its final surface tension value.

Under dynamic conditions, when the interface 61 is not steady but is continuously broken and formed again, the surface-active agent tends to restore status of the system to the steady conditions; this tendency is called "rearrangement" by those skilled in the art. A surface-active agent may be capable of migrating quickly to each new interface formed and effectively lowering the surface tension value (in this case, the behaviour under dynamic conditions is known as "fast rearrangement"), or may not be able to rearrange quickly enough to guarantee a migration of all the molecules available for lowering the surface tension, which accordingly remains higher (behaviour under dynamic conditions called "slow rearrangement").

It is possible to measure surface tension under dynamic conditions, indicated as DST, i.e. Dynamic Surface Tension, by way of a non-restrictive example using a method known as "Maximum Bubble Pressure" which, using a capillary through which air is blown into the liquid under analysis so as to form bubbles, measures surface tension in relation to the speed of formation of the bubbles. This instrumentation makes it possible to investigate the dynamic behaviour of a liquid system containing a surface-active agent at different surface renewal speeds, by means of a computing process known to those skilled in the art.

The surface-active agents present in the formulation of inks determine and stabilize the surface tension value. This parameter is used by head designers since, together with other factors such as the intrinsic viscosity of the ink, it conditions the geometrical sizing of the ejector assembly 55.

Design of the hydraulics of the head comprises the sizing of the inlet channels 53, the chambers 57, the resistors 27 and the nozzles 56 depending on the product objectives established at the outset. The ejection frequency, i.e. the frequency with which the droplets 51 are ejected through the nozzles 56, is limited by the speed at which the chambers 57 are filled by the ink.

The limit frequency beyond which the ejector 55 is no longer able to guarantee a regular ejection and the droplet 51 assumes uncontrolled speed and volume is called "maximum working frequency".

Filling of the nozzle 56 is regulated, as well as by the resistances to flow given by the ink's viscosity and by the geometrical parameters of the inlet channels, by the capillary pressure P determined according to the following known expression (formula A):

$$P = 2 * \tau * \cos(\alpha/r)$$

where:

$\tau$ is a generic surface tension of the ink 142;

$\alpha$ is an angle of contact measured between the ink and a surface of the same material as the nozzle plate 106;

r is the radius of the nozzle 56.

The generic surface tension $\tau$ of the ink also determines the interaction of the droplet 51 with the physical medium, generally a sheet of paper. The tendency of the droplet as it impacts on the paper to spread out to varying degrees regulates the type of image the user wishes to obtain.

In fact, the black inks used to compose characters in written texts have a surface-active agent content that lowers the surface tension of the medium to a value of between 40 and 45 mN/m, a value that allows limited "spreading" of the droplet, which thus results in a dot that has spread very little and has well-defined outlines.

For the sake of reference, it should be remembered that the surface tension $\tau$ of water is 71.9 mN/m at 25° C.

Colour inks, on the other hand, generally used to form pictures, have a surface-active agent content that brings the final surface tension to a value preferably between 30 and 35 mN/m, so that there is greater spreading on the paper and consequently the final image is homogeneous without presenting areas of lesser coverage. Spreading is still however influenced by other factors, such as for instance composition of the paper.

The surface-active agents used in inks for thermal ink jet printers are usually present in concentrations greater than or equal to their critical micellar concentration (cmc) in that system, to guarantee that the surface tension is maintained constant by the system above its cmc.

In fact, when there is a change in the number of molecules 74a of surface-active agent at the interface 61, the micelles 63 permit a restoral of the steady conditions by releasing some molecules 74b from the micelles at the interface, or by absorbing an excess of molecules in the micelles 63.

It is also known that the surface-active agent above its cmc is capable of minimizing the effect of one colour field encroaching upon another, as described for instance in U.S. Pat. No. 5,626,655.

During regular ejection of droplets 51 from a thermal type ink jet printing head, the generation and expulsion of consecutive droplets inside the nozzle 56 follow one another at a certain frequency, with the formation of a new air/ink interface each time a droplet separates.

The surface-active agent present in the ink may be capable of rearranging quickly, that is to say of migrating quickly to each new interface that is formed, or may rearrange slowly and not lower the surface tension value in good time. As the real situation while the head is operating is far removed from the equilibrium conditions of a static system, it is important to characterize the ink, not just with its static surface tension value $\tau_{stat}$, but also with its dynamic value DST, as reported for instance in U.S. Pat. No. 4,492,968.

To guarantee a good wettability of the print medium by the ink, the surface-active agents used in the formulations for thermal ink jet printing often have a dynamic behaviour that guarantees fast rearrangement of the molecules of surface-active agent at the interface in such a way that the ejected droplet that impacts on the paper has a surface tension as close as possible to its static value, as reported in U.S. Pat. No. 5,650,543.

Fast rearrangement implies a DST value close to the $\tau_{stat}$ value. This low surface tension value in operating conditions in turn implies a low capillary pressure P, according to the formula A. The low capillary pressure P in turn implies low speed filling of the nozzle 56, and consequently a limited maximum ejection frequency.

In ink jet printing the current technology tends towards an ever higher working frequency ($\geq 10$ KHz) with respect to those of the previous technologies. High speed printing is becoming a characteristic qualifying the product; accordingly therefore a fundamental aspect of the technology is that of managing to eject droplets at high frequencies without detracting from the quality of the printed image.

The quality of the printed image also depends on regularity of the direction of the droplets ejected: if there are ink residues from previous ejections in and around the hole of the nozzle 56, this causes non-reproducible trajectories in the successive ejections, with resultant misalignment on the paper.

According to this invention, an ink is produced for thermal ink jet printing containing a surface-active agent with a "slow rearrangement" type dynamic behaviour.

Slow rearrangement implies a DST value greater than $\tau_{stat}$. This high surface tension value under operating conditions in turn implies a high capillary pressure P, according to the formula A. The high capillary pressure P in turn implies high speed filling of the nozzle 56, and accordingly a high maximum ejection frequency.

Moreover, a high surface tension under dynamic head operating conditions allows the ejection hole to remain free of ink residues, as a result of the greater cohesion force between the molecules of the ink.

DISCLOSURE OF INVENTION

The object of this invention is to produce an ink which, after the ejection of each droplet from the printhead, has a surface tension DST greater than $\tau_{stat}$, so that the capillary pressure P is maximal.

Another object is to increase the filling speed of the nozzle 56 as a result of the increased capillary pressure P.

A further object is to maximize the droplet ejection frequency as a result of the increased nozzle filling speed.

Another object is to increase printing speed.

Yet another object is to keep the outlet hole free of ink droplet residues during the ejection.

A further object is to maintain a correct wettability of the ink in respect of the paper.

These and other objects, characteristics and advantages of the invention will become clear from the description that follows of a preferred embodiment, provided by way of a non-restricting example.

BEST MODE FOR CARRYING OUT THE INVENTION

The inks for thermal ink jet printing generally but not exclusively contain the following compounds:
  a water-based solvent;
  a humectant, i.e. a solvent, or a mix of solvents, miscible with water and having a vapour pressure lower than that of water;
  a dye, or a mix of dyes, soluble in the humectant;
  a surface-active agent, or a mix of surface-active agents; and
  a biocide.

The ink that this invention relates to may be made, for example, of the following substances, according to the percentages listed by way of non-restrictive example:
  water-based solvent: consisting of water deionized at 18 Mohm, used in percentages of between 60% and 90% by weight, preferably between 75% and 85% by weight;
  humectant: consisting of water-soluble organic solvents characterized by having high boiling points and low vapour pressures; the following may be quoted as non-restrictive examples: glycols of a low molecular weight such as ethylene glycol, diethylene glycol, triethylene glycol, propylene glycol, pentandediol, hexanediol; water-soluble glycol ethers, such as methyl-, ethyl-, butyl-cellosolve, methyl-, 2-(2-butoxyetoxy) ethanol, 1,1,1-tris(hydroxymethyl)-propane, 1,3-dimethyl-2-imidazoledinone; glycerol; 2-pyrrolidone, N-methyl-2-pyrrolidone, N-(2-hydroxyethyl)-2-pyrrolidone.

The humectant system is preferably a mix comprising a main humectant selected from the above-mentioned solvents, in a percentage ranging from 5% to 30% by weight and preferably between 10% and 20% by weight, and a secondary one, preferably butyl carbitol, in percentages ranging from 1% to 10% by weight and preferably between 1% and 5% by weight.

Use of the above-mentioned solvents or a mixture of these is justified both by the need to keep evaporation of the ink low in the area of the nozzle 56, including when the head is not used for long periods of time, and also by the need to improve solubility of the dye in the water-based solvent. The organic solvent is generally used in concentrations of between 1% and 30% by weight;
  dye: by way of non-restrictive example, the following dyes may be quoted: Food Black 2, a mixture of azoic dyes such as BAYSCRIPT® Schwartz N01 (a registered trademark of Bayer AG. Leverkusen, GERMANY), Direct Black 168 and Direct Black 195 for the black inks, and the dyes Direct Blue 86, Direct Blue 199, Acid Blue 9, Acid Yellow 23, Direct Yellow 86, Acid Red 52 and Acid Red 249 for the colour inks.

These dyes are used preferably in percentages ranging from 0.5% to 10% by weight;

pH regulator: used in order to keep the pH within the desired range. As a non-restrictive list, the following compounds are quoted: phosphates, borates, carbonates, sodium, potassium and ammonium acetates, mixtures of which may also be used;

surface-active agent: the surfactant system of this invention comprises a surfactant which, when included in the formulation of the ink in a given concentration, has a "slow rearrangement" type dynamic behaviour. A number of preferred products are designated in the examples reported below, among which non-ionic surface-active agents such as for example alkylaryl ethoxylates, ethoxylated alcohols, ethylene oxide-propylene oxide copolymers, polyalkyl glucosides;

biocide: Commercial biocides are used, such as a mixture of semiformal glycols and isothiazolinones such as PREVENTOL® D6 (a reaistered trademark of Bayer AG. Leverkusen, GERMANY) and 1,2-benzoisothioazolin-3-one, such as PROXEL® (a reaistered trademark of Zeneca, UK).

The ink is prepared according to the following process:

to the humectant or to the humectants a small amount of deionized water is added and mixed with the surface-active agent in the established quantities;

the resulting mix is mechanically agitated for a time of between 5 and 10 minutes at room temperature; and the other components of the formulation are added.

Chemical/physical characterization of the inks is usually effected by measuring and recording the values for pH, static surface tension $\tau_{stat}$, viscosity η, dynamic surface tension τ, using the following instrumentation respectively:

measurement of pH: performed with a Metrohm pHmeter (mod. 654);

measurement of static surface tension $\tau_{stat}$: conducted @ 25° C. with a Kruss tensiometer (mod. K10) and expressed in mN/m;

measurement of viscosity η: conducted @ 25° C. with a Contraves viscosity meter (mod. Rheomat 115) and expressed in mPa*s; and measurement of dynamic surface tension DST: conducted using the Lauda MPT2 instrument, configured for short bubble formation times, and expressed in mN/m.

Figure 3:
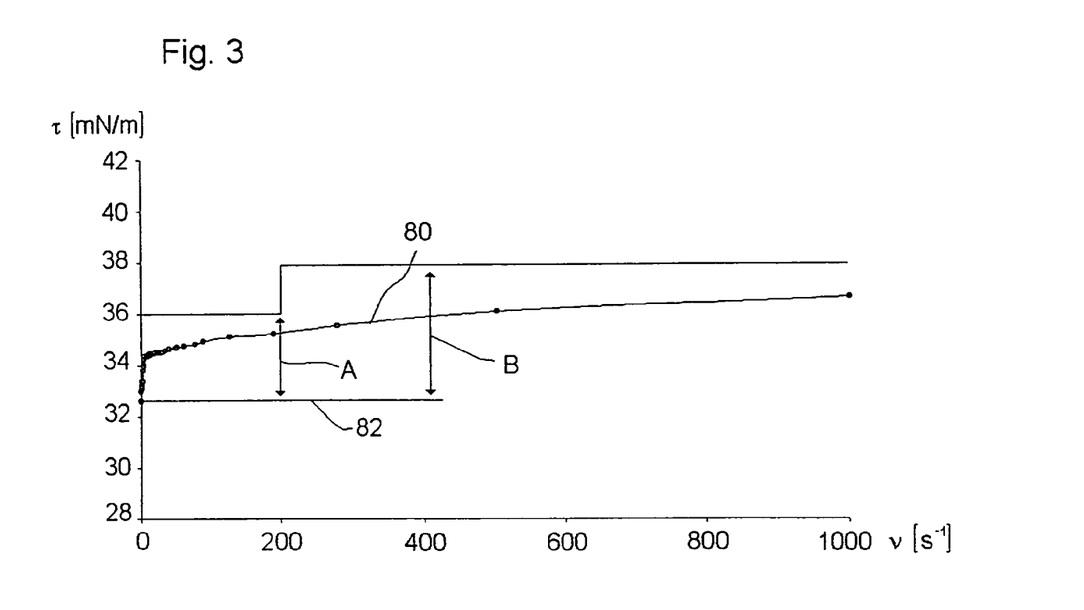
FIG. 3 is a DST graph of a colour ink according to the known art.

FIG. 3 depicts a graph 80 of Dynamic Surface Tension (DST) obtained by means of a maximum bubble pressure dynamic tensiometer for an ink for ink jet printing; the surface tension τ is shown on the y-axis and is expressed in mN/m, the bubble formation frequency ν is shown on the x-axis and is expressed in $s^{-1}$. The frequencies between 0 and 1000 $s^{-1}$ are reported.

The graph 80 is relative to a colour ink for ink jet printers, according to the known art and designated "known ink" in the following, made of the components listed earlier and characterized by a surfactant system containing, for instance, a variable percentage of between 2% and 5% by weight of an acetylenediol ethoxylated such as SURFYNOL® 465 (a realstered trademark of Air Products & Chemicals. Inc. Allentown. Pa. USA).

An illustrative, non-restrictive composition of the known ink is given below:

| | |
|---|---|
| Deionized water | 69.9% by weight |
| 2-pyrrolidone | 20% by weight |
| Diethylene glycol-monobutylether | 3% by weight |
| Direct Blue 199 | 3% by weight |
| SURFYNOL ® 465 | 3% by weight |
| PREVENTOL ® D6 | 0.1% by weight |
| EDTA | 1% by weight |

The static surface tension value $\tau_{stat}$ of the known ink is 32.5 mN/m and is identifiable in FIG. 3 with the level 82, corresponding to a bubble ejection frequency value ν of zero.

The pattern revealed by a generic DST graph may be of two types:

fast dynamic rearrangement pattern: case where the DST pattern satisfies the following conditions:

for ν less than 200 $s^{-1}$: $\tau < \tau_{stat} + A$, where A=3.5 mN/m for ν between 200 and 1000 $s^{-1}$: $\tau < \tau_{stat} + B$, where B=5.5 mN/m slow dynamic rearrangement pattern: case where the graph does not satisfy the above-mentioned conditions.

The graph 80 of FIG. 3 depicts a fast dynamic rearrangement pattern.

The formulation of a preferred embodiment of ink for ink jet printing, the object of this invention, is described below; a first ink according to this invention is made of the compounds listed previously for the known ink, from which it differs solely in its surfactant system, the first ink possessing, as a non-restrictive example, a surfactant system consisting of a polyalkyl glucoside.

Polyalkyl glucosides are non-ionic surface-active agents formed from a natural sugar, glucose, and alcohols, and are represented by the generic formula:

where R represents a generic alkyl chain, and n is the degree of polymerization of the glucose; normally n is not greater than 1, on account of limits set by the type of synthesis of the polyalkyl glucoside.

Polyalkyl glucosides have good detergent properties and, by virtue of their low toxicity, they are widely used today in a variety of applications where the ecological impact on users is fundamental. Thus they are used in the field of cosmetics, as industrial detergents in processes with low environmental impact, as washing agents for fruit and vegetables, in shampoos for children, as emulsifiers for food products and also as dispersing agents for pesticides and herbicides.

They are also known to be used as additives for inks used in the production of colour laminates, where they increase the adhesion of the inks to the metallic rollers that they come into contact with during machining.

Preferably the polyalkyl glucoside used in the invention is a polyalkyl glucoside with alkyl chain C8/14, such as GLUCOPON® 650 EC (a registered trademark of Cogins Corporation, Cincinnati, Ohio USA), used in a percentage preferably between 0.1% and 3% by weight of active substance.

The table below compares the properties of the first ink according to this invention with the known ink:

|  | First ink | known ink |
|---|---|---|
| pH | 7.7 | 7.7 |
| $\tau_{stat}$ (mN/m) | 30.1 | 32.5 |
| $\eta$ (mPa * s) | 2.14 | 2.2 |
| DST | Slow rearrangement | Fast rearrangement |

Figure 4:
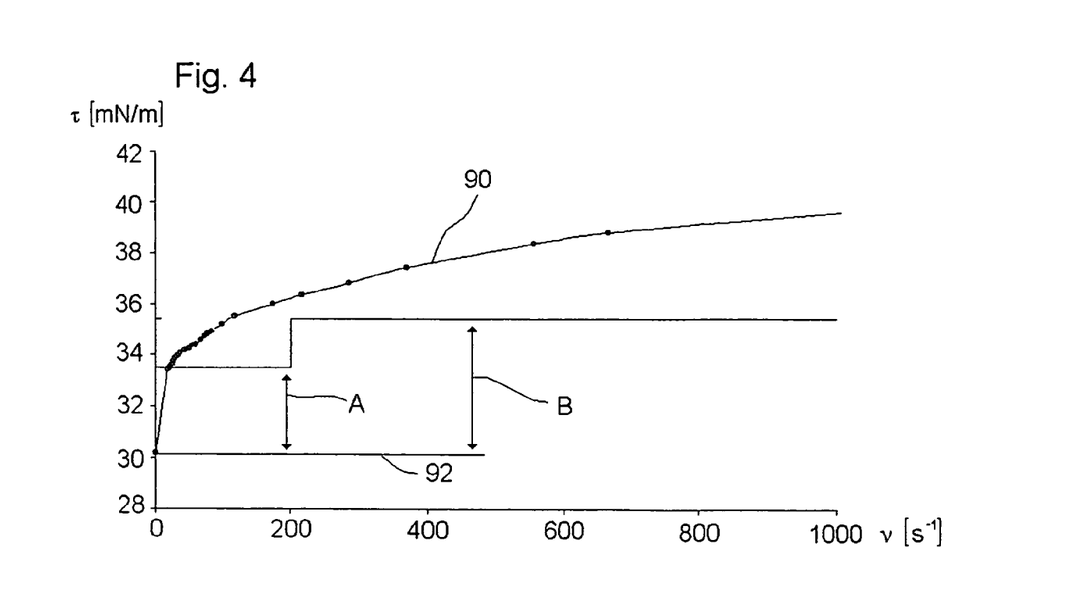
FIG. 4 is a DST graph of a first ink according to this invention.

FIG. 4 is a graph 90 showing the pattern of the DST in relation to the droplet ejection frequency $\nu$ of the first ink, where the level 92 corresponds to the $\tau_{stat}$ value of the first ink.

The dynamic behaviour of the first ink of the invention is of the slow rearrangement type since it does not satisfy the dynamic fast rearrangement conditions.

A slow rearrangement pattern implies that, during dynamic conditions such as those when the head is operating, the ink has a surface tension higher than its static value and therefore that the capillary pressure which regulates the filling of the nozzle 56 allows a greater nozzle filling speed and therefore a higher droplet ejection frequency.

The table below compares the maximum ejection frequencies that can be reached by different heads called, on the basis of their hydraulic characteristics, hydraulics1 and hydraulics2, and filled with the first ink and the known ink:

|  | Maximum ejection Frequency (kHz) | |
|---|---|---|
|  | first ink | known ink |
| Hydraulics1 | 12.7 | 9.9 |
| Hydraulics2 | 6 | 4.5 |

For like hydraulics, use of the first ink according to this invention guarantees a gain in maximum ejection frequency of about 30% with respect to use of the known ink and allows the same printing quality to be obtained.

Moreover, the printing quality of the first ink and of the known ink are perfectly identical on a broad range of media, such as for example plain paper, films, photographic papers, and for different test images.

The stability of the first ink according to this invention after storage, at room temperature and at higher temperatures, was found to be comparable to that obtained in the same test with the known ink.

The head functional checks confirm that the first ink is comparable to the known ink in the clogging tests as well, which check the degree of nozzle obstruction in heads under specific storage time and temperature conditions, and in the kogation tests, which check the status of the resistors in defined ranges of numbers of droplets ejected.

Second Embodiment

A second ink according to this invention is made of the compounds listed above for the known ink, from which it differs solely in its surfactant system, the second ink having as its surfactant system an ethoxylated alcohol.

Preferably the ethoxylated alcohol used in the invention is a primary ethoxylated alcohol having an alkyl chain C11 and 7 ethoxy units, such as the commercial product called LIALET™ 111/7 (available from Condea Vista, Houston. Tx. USA), used in a percentage preferably between 0.1% and 3% by weight.

The table below compares the properties of the second ink with the known ink:

|  | second ink | known ink |
|---|---|---|
| pH | 7.7 | 7.7 |
| $\tau_{stat}$ (mN/m) | 29.9 | 32.5 |
| $\eta$ (mPa * s) | 2.2 | 2.2 |
| DST | slow rearrangement | fast rearrangement |

Figure 5:
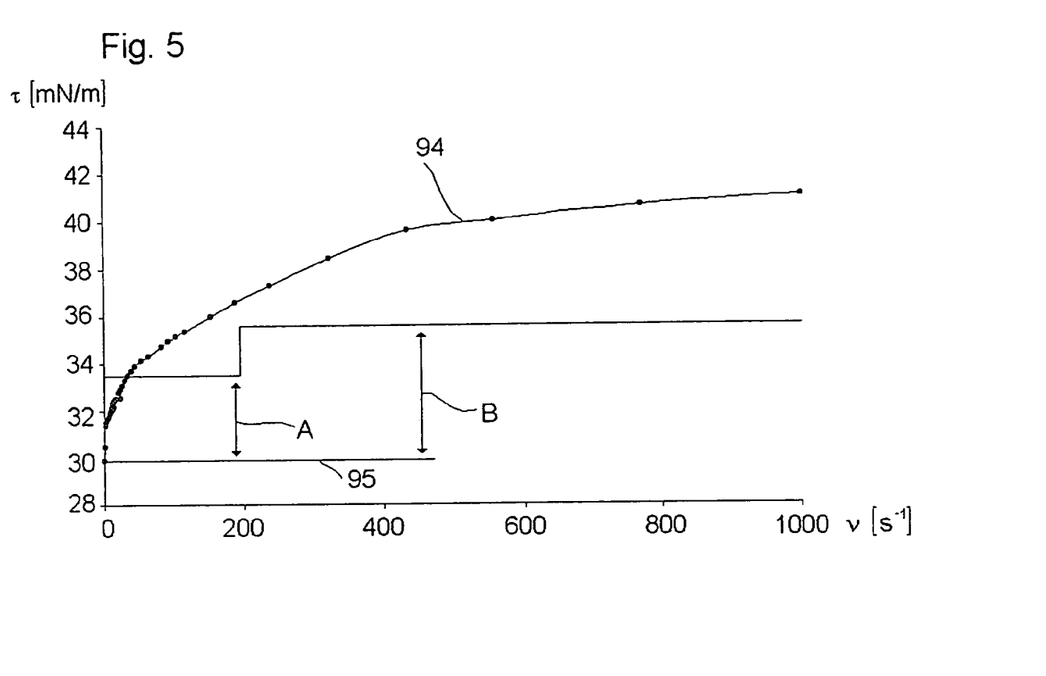
FIG. 5 is a DST graph of a second ink according to this invention.

FIG. 5 is graph 94 illustrating the pattern of the DST in relation to the droplet ejection frequency $\nu$ of the second ink, where the level 95 corresponds to the $\tau_{stat}$ value of the second ink.

The dynamic behaviour of the second ink according to this invention is also of the slow rearrangement type because it does not satisfy the dynamic fast rearrangement conditions.

The table below compares the maximum ejection frequencies that can be obtained with a head having hydraulics identified as hydraulics3 and filled with the second ink and the known ink:

|  | Maximum ejection Frequency (kHz) | |
|---|---|---|
|  | second ink | known ink |
| Hydraulics3 | 6.8 | 5.9 |

For like hydraulics, use of the second ink according to this invention guarantees a gain in maximum ejection frequency of about 15% with respect to use of the known ink, and allows the same printing quality to be obtained.

In fact the printing quality of the second ink and of the known ink are perfectly similar on a wide variety of media, such as for instance plain paper, films, photographic papers, and for different test images.

Third Embodiment

A third ink according to this invention is made of the compounds listed above for the known ink, from which it differs solely in its surfactant system, the third ink having as its surfactant system an ethoxy-propoxylated alcohol, having preferably an alkyl chain C12/14 with 7 ethoxy units and 4.5 propoxy units, such as the commercial product called SOFTANOL® EP7045 (a registered trademark of Ineos Oxide, UK), used in a percentage preferably between 0.1% and 3% by weight.

The table below compares the properties of the third ink according to this invention with the known ink:

|  | third ink | known ink |
|---|---|---|
| PH | 7.7 | 7.7 |
| $\tau_{stat}$ (mN/m) | 31.4 | 32.5 |
| $\eta$ (mPa * s) | 2.2 | 2.2 |
| DST | slow rearrangement | fast rearrangement |

Figure 6:
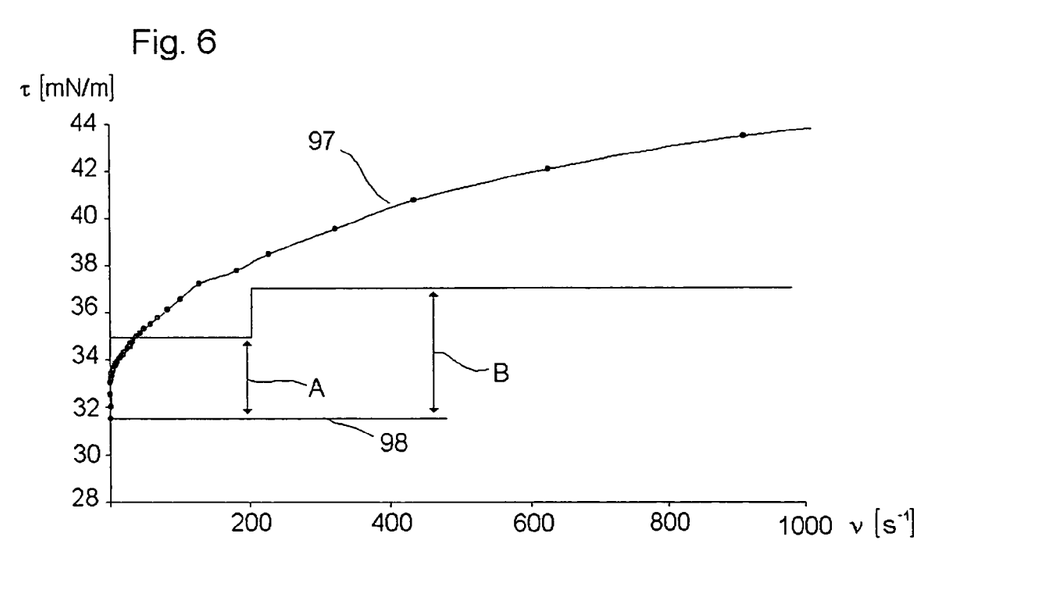
FIG. 6 is a DST graph of a third ink according to this invention.

FIG. 6 is a graph 97 illustrating the pattern of the DST in relation to the droplet ejection frequency ν of the third ink, where the level 98 corresponds to the $\tau_{stat}$ value of the third ink.

The dynamic behaviour of the third ink according to this invention is also of the slow rearrangement type because it does not satisfy the dynamic fast rearrangement conditions.

The table below compares the maximum ejection frequencies that can be obtained from a head having hydraulics identified as hydraulics3 and filled with the third ink and the known ink:

|  | Maximum ejection Frequency (kHz) | |
|---|---|---|
|  | third ink | known ink |
| Hydraulics3 | 7.1 | 5.9 |

For like hydraulics, the use of the third ink according to this invention guarantees a gain in maximum ejection frequency of about 20% with respect to use of the known ink and allows the same printing quality to be obtained.

In fact, the printing quality of the third ink and of the known ink are perfectly identical on a broad range of media, such as for instance plain paper, films, photographic papers, and for different test images.

Fourth Embodiment

A fourth ink according to this invention is made of the compounds listed above for the known ink, from which it differs solely in its surfactant system, the fourth ink having as its surfactant system a fluorinated surfactant. Fluorinated surfactants, by way of their great capacity for reducing static surface tension even in low concentrations, are known as "superwetters" to those skilled in the art.

Preferably the fluorinated surfactant is a fluorinated alkyl ester such as FLUORAD® FC-430 (a reaistered trademark of The 3M Company, St. Paul. Minn. USA) used in a percentage preferably between 0.1% and 1% by weight.

The table below compares the properties of the fourth ink according to this invention with the known ink:

|  | fourth ink | known ink |
|---|---|---|
| pH | 7.7 | 7.7 |
| $\tau_{stat}$ (mN/m) | 24 | 32.5 |
| η (mPa * s) | 2.1 | 2.2 |
| DST | slow rearrangement | fast rearrangement |

Figure 7:
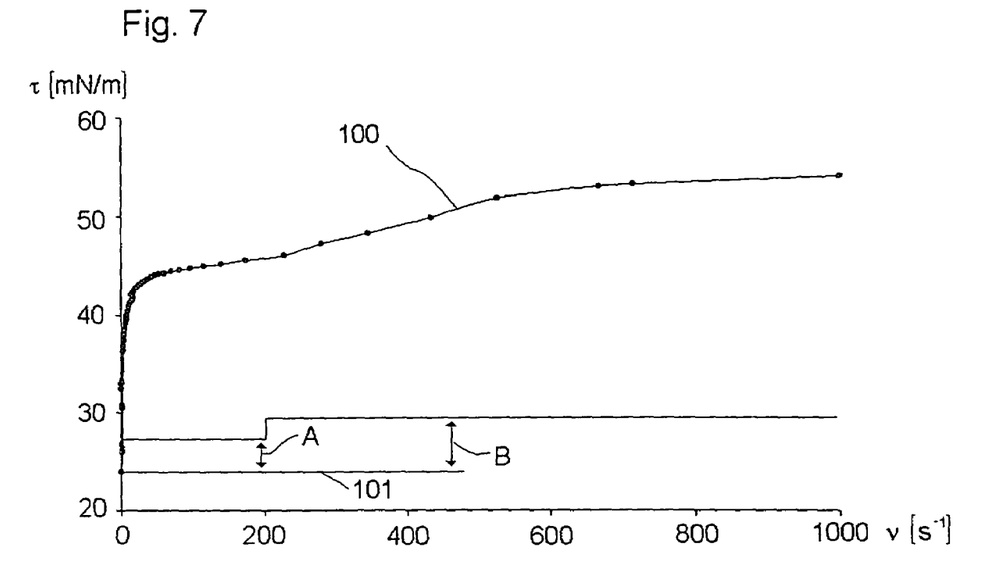
FIG. 7 is a DST graph of a fourth ink according to this invention.

FIG. 7 is a graph 100 illustrating the pattern of DST in relation to the droplet ejection frequency ν of the fourth ink, where the level 101 corresponds to the $\tau_{stat}$ value of the fourth ink.

The dynamic behaviour of the fourth ink according to this invention is also of the slow rearrangement type because it does not satisfy the dynamic fast rearrangement conditions.

The table below compares the maximum ejection frequencies that can be obtained with a head having hydraulics identified as hydraulics3 and filled with the fourth ink and the known ink:

The results are included in the following comparison table:

|  | Maximum ejection Frequency (kHz) | |
|---|---|---|
|  | fourth ink | known ink |
| Hydraulics3 | 9.5 | 6 |

For like hydraulics, the use of the fourth ink guarantees a gain in maximum ejection frequency of about 50% with respect to use of the known ink.

The invention claim is:

1. A composition of an ink for ink jet printing, comprising water, a humectant, a soluble dye and a non-ionic surfactant, wherein said ink composition is of the slow rearrangement type, and wherein said surfactant comprises an ethoxylated alcohol.

2. The composition of claim 1 wherein said ethoxylated alcohol is present in the ink in a percentage between 0.1% and 5% by weight.

3. A composition of an ink for ink jet printing, comprising water, a humectant, a soluble dye and a non-ionic surfactant, wherein said ink composition is of the slow rearrangement type, and wherein said surfactant comprises an ethoxy-propoxylated alcohol.

4. The composition of claim 3, wherein said ethoxy-propoxylated alcohol is present in the ink in a percentage between 0.1% and 5% by weight.

5. The composition of claim 1, wherein said humectant consists of a main humectant and a secondary humectant.

6. The composition of claim 5, wherein said main humectant is selected from the group consisting of 2-pyrrolidone, pentanediol, 1,1,1,tris(hydroxymethyl)-propane, and 1,3 dimethyl-2-imidazoledinone.

7. The composition of claim 6, wherein said main humectant is present in a percentage between 5 and 30% by weight.

8. The composition of claim 5, wherein said secondary humectant is 2-(2-butoxymethoxy)ethanol.

9. The composition of claim 8, wherein said secondary humectant is present in a percentage ranging from 1% to 10% by weight.

10. The composition of claim 1, wherein said dye is selected from the group consisting of Food Black 2, a mix of azoic dyes, Direct Black 168 and Direct Black 195 for the black inks and the dyes Direct Blue 86, Direct Blue 199, Acid Blue 9, Acid Yellow 23, Direct Yellow 86, Acid Red 52 and Acid Red 249 for the colour inks and mixtures thereof.

11. The composition of claim 10, wherein said dye is present in a percentage between 0.1% and 10% by weight.

12. The composition of claim 1, further comprising a pH regulator system, wherein said regulator system is selected from the group consisting of phosphates, borates, carbonates, sodium acetates, potassium acetates and ammonium acetates, and a mixtures thereof.

13. The composition of claim 1, further comprising a biocide system, wherein said biocide system is selected from the group consisting of a mixture of semiformal glycols and isothiazolinones, 1,2-benzoisothioazolin-3-one, and mixtures thereof.

14. A method of preparing a composition of an ink according to claim 1, said method comprising the steps of:

adding to the humectant or to the humectants a small amount of deionized water and mixing with the surface-active agent;

mechanically agitating the mix obtained for a time of between 5 and 10 minutes at room temperature; and adding the other components of the composition.

15. The composition of claim 1 wherein said ink possesses the following properties:

pH between 7.5 and 9;

viscosity η between 1.2 and 5 mPa*s @ 25° C.; and surface tension τ between 20 and 50 mN/m @ 25° C.

16. A thermal ink jet printhead, comprising a tank containing an ink having the composition of claim 1.

17. An ink tank for refillable printheads for thermal ink jet printing, wherein said ink tank contains ink having the composition of claim 1.

18. A thermal ink jet printing process comprising the steps of:

having a printhead comprising a tank containing an ink having the composition of claim 1, and using said printhead on a thermal ink jet printer to deposit droplets of said ink on a medium.

19. The composition of claim 1, wherein said ethoxylated alcohol is a primary ethoxylated alcohol comprising an alkyl chain with 11 carbon atoms and 7 ethoxy units.

20. The composition of claim 2, wherein said ethoxylated alcohol is present in the ink in an amount from 0.1% to 3% by weight.

21. The composition of claim 3, wherein said ethoxy-propoxylated alcohol comprises an alkyl chain with 12 to 14 carbon atoms, 7 ethoxy units, and 4.5 propoxy units.

22. The composition of claim 4, wherein said ethoxy-propoxylated alcohol is present in the ink in an amount from 0.1% to 3% by weight.

23. The composition of claim 7, wherein said main humectant is present in the ink in an amount from 10 to 20% by weight.

24. The composition of claim 9, wherein said secondary humectant is present in the ink in an amount from 1% to 5% by weight.

25. The composition of claim 11, wherein said dye is present in the ink in an amount from 0.1% to 5% by weight.

26. An ink composition for a high droplet ejection frequency printing system, said composition comprising water, a humectant, a soluble dye, and a non-ionic surfactant comprising an ethoxylated alcohol or an ethoxy-propoxylated alcohol, wherein said ink composition is of a slow rearrangement type such that its dynamic surface tension is maintained with a slow dynamic rearrangement pattern.

27. The composition of claim 26, wherein said surfactant is present in the ink composition in an amount from 1% to 3% by weight.

28. The composition of claim 26, wherein said surfactant comprises an ethoxylated alcohol comprising an alkyl chain with 11 carbon atoms and 7 ethoxy units.

29. The composition of claim 26, wherein said surfactant comprises an ethoxy-propoxylated alcohol comprising an alkyl chain with 12 to 14 carbon atoms, 7 ethoxy units and 4.5 propoxy units.

30. A thermal ink jet printhead connected to a tank containing an ink of a slow rearrangement type, said ink comprising water, a humectant, a soluble dye and a non-ionic surfactant comprising an ethoxylated alcohol or an ethoxy-propoxylated alcohol.

31. The thermal ink jet printhead of claim 30, wherein said surfactant comprises a primary ethoxylated alcohol comprising an alkyl chain with 11 carbon atoms and 7 ethoxy units.

32. The thermal ink jet printhead of claim 30, wherein said surfactant comprises an ethoxy-propoxylated alcohol comprising an alkyl chain with 12 to 14 carbon atoms, 7 ethoxy units and 4.5 propoxy units.

33. The thermal ink jet printhead of claim 30, wherein said surfactant is present in said ink in an amount from 0.1% to 3% by weight.

34. A high ejection frequency thermal ink jet printing process comprising ejecting droplets of an ink having the composition of claim 1, from a printhead of a thermal ink jet printer at an ejection frequency wherein said ink has a dynamic surface tension that is maintained at least 5.5 mN/m greater than the static surface tension of said ink.

35. A high ejection frequency thermal ink jet printing process comprising ejecting droplets of an ink having the composition of claim 3, from a printhead of a thermal ink jet printer at an ejection frequency wherein said ink has a dynamic surface tension that is maintained at least 5.5 mN/m greater than the static surface tension of said ink.

36. A high ejection frequency thermal ink jet printing process comprising ejecting droplets of an ink from a printhead of a thermal ink jet printer at an ejection frequency wherein said ink has a dynamic surface tension that is maintained at least 5.5 mN/m greater than the static surface tension of said ink.

37. The process of claim 36, wherein said ink comprises water, a humectant, a soluble dye and a non-ionic surfactant, wherein said surfactant comprises an ethoxylated alcohol or an ethoxy-propoxylated alcohol.

38. The process of claim 37, wherein said surfactant is present in said ink in an amount from 0.1% to 5% by weight.

39. The process of claim 37, wherein said surfactant comprises a primary ethoxylated alcohol comprising an alkyl chain with 11 carbon atoms and 7 ethoxy units.

40. The process to claim 37 wherein said surfactant comprises an ethoxy-propoxylated alcohol comprising an alkyl chain with 12 to 14 carbon atoms, 7 ethoxy units and 4.5 propoxy units.

* * * * *